Sept. 1, 1931.  W. G. WILSON  1,821,862
SEALING RING FOR JOINTS
Filed June 24, 1929  2 Sheets-Sheet 1
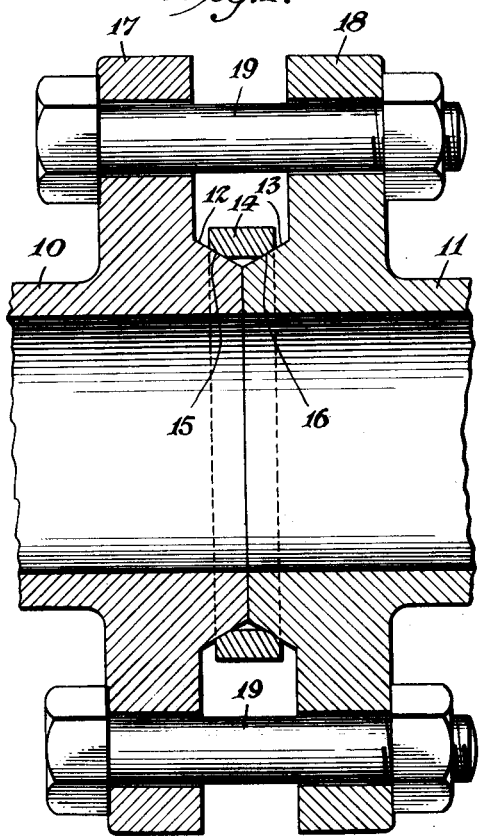
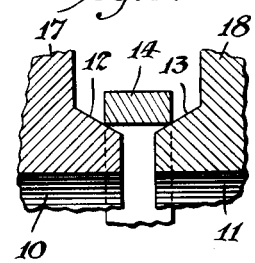
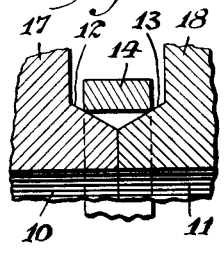
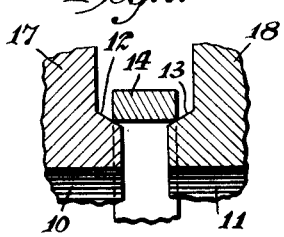
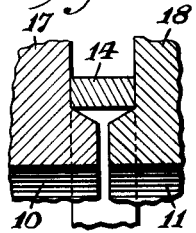
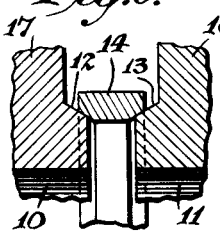
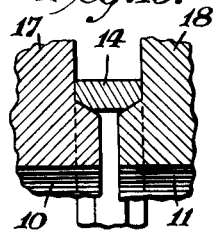
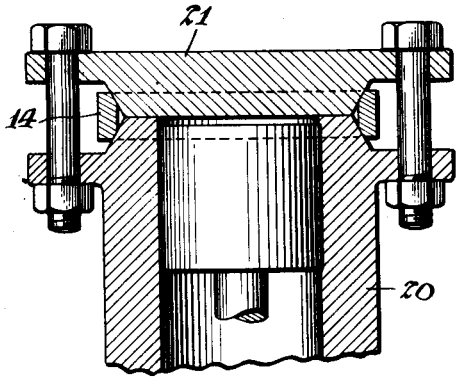
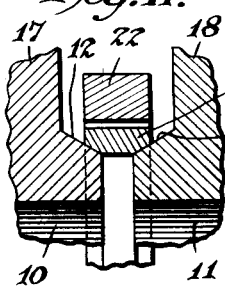
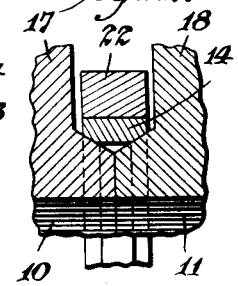

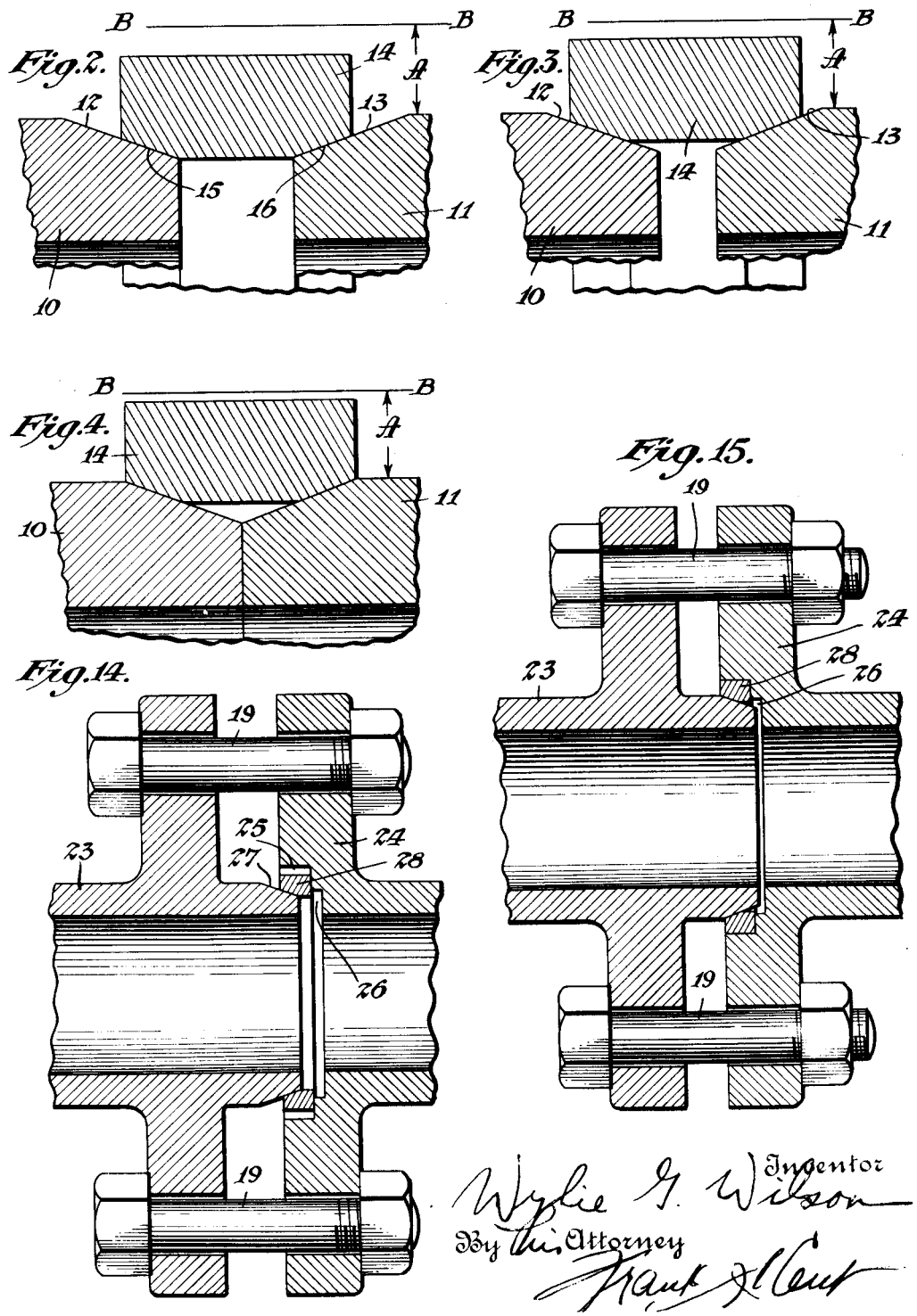

Patented Sept. 1, 1931

1,821,862

UNITED STATES PATENT OFFICE

WYLIE G. WILSON, OF ELIZABETH, NEW JERSEY

SEALING RING FOR JOINTS

Application filed June 24, 1929. Serial No. 373,142.

This invention relates to an improved joint structure for forming a fluid seal between two bodies, and to a method for forming the joint.

The invention is particularly applicable to forming a sealed joint between cylindrical bodies, such as pipes, and is carried out by forming each of the bodies with a tapered surface near an end of the body. A resilient sealing ring cooperates with the tapered surfaces and the parts are so proportioned that as the ends of the cylindrical bodies are drawn toward each other, the tapered surfaces cause the sealing ring to yield as a unit.

Due to the yielding resilience of the sealing ring the parts of the joint can be finished by ordinary commercial machining methods, and hence the joint is very economical. At the same time the joint can be made tight against high pressures with the application of only moderate pressure on the fastening device by even unskilled hands.

An important feature of the invention resides in the fact that the final position of the parts can be exactly predetermined, since the seal is formed entirely independently of the meeting of the faces that determine the final position.

These and other objects and advantages of the invention will become apparent as the description proceeds.

While preferred forms of the invention have been disclosed for purposes of illustration, it should be understood that various changes may be made in the structure without departing from the spirit and scope of the invention as hereinafter set forth and claimed.

In the drawings:

Fig. 1 is a longitudinal section through a joint embodying the invention.

Fig. 2 is an enlarged partial longitudinal section showing the preliminary position of the parts.

Fig. 3 is a view similar to Fig. 2 but showing the parts in a partly drawn-up position.

Fig. 4 is a view similar to Fig. 2 with the parts in final position.

Figs. 5 to 12 inclusive are partial longitudinal sections showing different modifications of the joint structure.

Fig. 13 is a longitudinal section illustrating a particular use of the joint of this invention.

Fig. 14 is a longitudinal section illustrating a different application of the invention.

Fig. 15 is a view similar to Fig. 14 but showing the parts in final sealed position.

Referring to Fig. 1 more particularly, which shows a preferred embodiment, the reference characters 10 and 11 are applied to two pipe ends that are to be joined with a leak-tight seal. The end of pipe 10 is formed with a peripheral conical surface 12, and the pipe 11 is formed with a similar conical surface 13. The sealing ring 14 is formed of resilient material and is of general rectangular cross-section, but its inner corners are cut away to produce sloping surfaces 15 and 16 that are formed on substantially the same angles as the surfaces 12 and 13, respectively. The parts thus far described are made of suitable materials and suitable dimensions to produce a sealed joint as hereinafter set forth.

Any preferred means is provided for drawing the pipe ends 10 and 11 together, the means illustrated in Fig. 1 comprising flanges 17 and 18 and bolts 19.

The movement of the parts while the joint is being drawn up is illustrated in Figs. 2, 3 and 4. In these views the line B—B is shown at a constant distance A from pipe 11 to assist in visualizing the movement of the sealing ring.

Fig. 2 shows the joint in assembled position before any pressure has been applied. It will be noted that the openings in the ring 14 are of such a size that the ring slips over the tapered ends of the pipes permitting the surfaces 12 and 13 of the pipe ends to engage the surfaces 15 and 16, respectively of the ring.

Pressure is now applied to draw the pipe ends 10 and 11 together, as by tightening up on the bolts 19. As the pipe ends approach each other the tapered surfaces 12 and 13 apply a powerful wedging action to the sealing ring, which is formed of such dimensions and material that it yields outwardly as a unit without any appreciable change in its cross sectional dimensions. The ring, being of relatively strong, resilient material, stoutly resists the outward pressure of the wedging surfaces on the pipe ends, and as a result the contacting surfaces of the ring and pipe ends are pressed powerfully together while they slide over each other in a direction axially of the pipe line, and thus one surface is lapped against another. The yieldability of the ring also permits a complete floating adjustment of the contacting surfaces to compensate for inaccuracies in machining.

These reactions commence as soon as the pipe ends are moved toward each other from the position of Fig. 2, and very little movement is required to form a fluid seal. Fig. 3 illustrates an intermediate position in which the pipe ends have been drawn partway together, and the sealing ring has moved bodily outward toward the line B—B. In this intermediate position the ring 14 forms a fluid tight seal.

Further tightening pressure on the joint moves the parts to the final position of Fig. 4. Here the ends of the pipes 10 and 11 are in contact and the ring 14 has yielded further in an outward direction toward line B—B. There can now be no further expansion of the ring.

In this final sealing position the ring 14 is in a condition of internal stress and is still pressing resiliently inward against the pipe ends, so that it is a live unit and can maintain the contacting surfaces in sealing relation regardless of slight variations in size or relative position of the pipe ends. We have, then, a live sealing ring resiliently pressing two surfaces into intimate contact.

The exact dimensions and material of the sealing rings are not important so long as they are such as to permit the ring to act as described above. In general, the material of the ring must have tensile strength and elasticity and is preferably a malleable or worked metal similar to, or softer than that of the pipes to be joined, and must be of a tensile strength suitable for the fluid pressure to which the joint is to be subjected. Thus for steel pipe the rings will preferably be of steel and for brass pipe the rings will preferably be of brass. Either steel or brass rings might be used on cast iron pipe. In experimental work with a 2″ pipe, the rings were given a thickness slightly less than that of the pipes to be joined, and the width of the rings was slightly greater than twice its thickness. Thus for a 2″ pipe with a $\frac{1}{16}$″ wall all the rings were made slightly less than $\frac{1}{16}$″ thick and ½″ wide. The rings must be wide enough to permit a sufficient amount of axial travel to produce the desired seal. For larger sizes of pipe the width of the rings should be greater, but this dimension need not increase as rapidly as the other dimensions of the ring. For example, with a 12″ pipe with a ¾″ wall, the ring could be slightly less than ¾″ thick and 1″ wide.

With these proportions the sealing ring will be relatively weaker than the walls of the pipes, so that the ring will yield outwardly as a unit and there will be practically no perceptible yielding of the walls of the pipes.

The joint described has a number of very outstanding advantages. In the first place, the parts can be finished by ordinary commercial machining. The ring is capable of yielding locally in any direction necessary to compensate for these inaccuracies, and this local yielding will be in addition to the outward yielding of the ring as a unit. The ring is also able to adjust itself to minor differences in level or angularity of the pipe ends.

When I say the ring expands as a unit, I mean that the ring expands throughout its entire length (measured axially of the pipe). In fact, in actual practice with a ring of the proportions shown in the drawings, the geometrical configuration of the ring's cross section (taken as in the drawings) is maintained insofar as the eye can detect, but the circumference of the ring is increased. In such a case the geometrical change of the ring in actual practice is similar in kind (not necessarily degree) to the geometrical change caused by an increase in temperature of the ring.

Another important feature is that the joint can be made tight against very high pressures with only a moderate amount of axial pressure drawing the pipe ends together. In conventional joints, as where a gasket is compressed between the pipe ends, considerable axial pressure must be applied, and the bolts are often drawn up so hard as to dangerously stress the bolts or bend or dangerously stress the flanges of the pipe. As proof of the fact that the joint of the present invention requires considerably less force the following test is cited:

The test was made on pipe ends equipped with standard bolting and flanges suitable for a working pressure of 125 lbs. per square inch. In such a joint made with ordinary gaskets the nuts have to be pulled up tightly with a wrench of a standard length. In the test a joint was made with the sealing ring structure of Fig. 1. In order to reduce the pressure applied to the nuts the standard wrench was cut in half. With this half length wrench the nuts were screwed up with only a very easy pull on the wrench. The joint was then subjected to a test pressure of 2000 lbs. per square inch, and showed absolutely no distress and no leakage. The nuts were then tightened up some more, still very easily, and again the joint showed absolute tightness under a pressure of 2000 lbs. per square inch.

A further advantage of the new joint lies in the fact that it is possible to bring the ends of the pipes into contact, eliminating the crevice present with conventional gaskets. This crevice is detrimental in many cases as it produces an eddy current and diminishes the flow of fluid through the pipe line. It also forms a lodging place in which putrefaction may take place, which is very undesirable in certain installations, as in lines carrying cane juice in sugar factories. The crevice also permits corrosive material, where such a material is being conveyed, to lodge and work uninterruptedly even though the pipe line be scoured by periodical flushing with clean water.

In a conventional joint where a packing member is compressed between cross-axial surfaces it is impossible to predetermine the final positions of the joint members on account of variations in the thickness and/or elasticity of the packing. But with the joint disclosed above the final positions of the joined members are determined by the direct contact of cross-axial abutment faces, and hence it is possible to predetermine the exact final positions of the joined parts. The sealing ring forms a seal entirely independently of the contact of the two abutment faces.

A particular example of this advantage is shown in Fig. 13. Here the numeral 20 indicates the cylinder of an air compressor, and 21 indicates the head of the cylinder. The clearance that must be left between the piston when at its top position and the head should be kept as small as possible, since the amount of air left in this clearance reduces the efficiency of the compressor. With ordinary packings it is not possible to accurately predetermine the clearance, and hence excess clearance must be left for safety. But with the sealing ring of the present invention applied as shown in Fig. 13 it is possible to predetermine this clearance and reduce it to the absolute minimum.

The meeting of the abutment faces also prevents further deformation of the ring, so that the amount of change of diameter of the ring can be kept within predetermined limits.

It will also be clear from Figs. 1 and 13 that the sealing ring acts to automatically center the two joined members. In the case of the pipe this insures perfect alinement of the bores, while in the case of Fig. 13 it eliminates the necessity for any centering projection extending from the head into the cylinder.

Different variations of the sealing structure are shown in Figs. 5 to 12.

Fig. 5 shows the preliminary position of a joint that is similar to Fig. 1 except that the sealing ring 14 is rectangular in cross section and does not have its inner corners tapered off. This ring will form a good seal, but the contacting surfaces of the ring are of less area than those shown in Fig. 1. The final drawn-up position of this joint is shown in Fig. 6.

The structure illustrated in Figs. 7 and 8 is identical with that of Figs. 5 and 6 except that the flanges 17 and 18, or similar abutment walls, are nearer the ends of the pipes, and hence these abutment walls engage the sides of the sealing ring after the ring has made a seal on the conical faces of the pipe ends. This engagement on the sides of the sealing ring forms a supplemental seal, and also determines the final position of the parts.

Figs. 9 and 10 show a joint that is identical with the one disclosed in Fig. 1, except that the flanges or other abutment walls 17 and 18 are closer to the pipe ends and hence these walls engage the sides of the sealing ring after the ring has made a seal on the conical faces of the pipe ends, thus producing a double seal.

In Figs. 11 and 12 the structure is similar to that of Fig. 1, but here the sealing ring 14, when in the final position, is in contact with a rigid abutment ring 22. With this construction the sealing ring can be reduced in strength, either by reducing the cross section of the ring or by using a weaker material, thereby reducing the amount of pressure required to draw the parts to the final sealing position. This construction permits the use of higher pressures within the pipe line than would otherwise be possible where the extra yieldable ring is used.

It will be noted that in each of the structures disclosed herein an external sealing ring cooperates with a peripheral surface that slopes inwardly toward the end of the pipe. In the drawings this sloping surface has been shown as conical, but it is not necessary to use this exact shape. For instance, the rounded taper formed on a pipe end when it is cut in an ordinary pipe cutter, and the pipe is smooth and free from irregularities, is quite suitable without further machining for use with the sealing ring of this invention. As an example of a suitable angle for the sloped surface, it may be stated that 16° has been found satisfactory in experimental work.

The joint of this invention is not limited to pipes, but can be used to form a leak-tight joint between any two cylindrical bodies, as will be clear from Fig. 13.

Another variation in the structure is illustrated in Figs. 14 and 15. Here a pipe 23 is to be joined to the flange 24 of a valve or other fitting. The flange is formed with a recess 25 and with an additional counter-bore 26, while the end of the pipe carries a peripheral conical surface 27. The ring 28 is formed on a diameter smaller than the recess 25 and is appropriately shaped to cooperate with the recess 25 and with the conical surface 27. Fig. 14 shows the parts in preliminary assembled position. When suitable pressure is applied to draw the end of pipe toward the flange 24, the conical surface 27 causes the ring 28 to expand as a unit and presses it powerfully against the outer wall of the recess 25. The position of the joint is shown in Fig. 15.

The structure and method disclosed herein furnish an inexpensive and reliable joint that is practically "fool-proof", since it is self-centering and self-compensating, and will form a fluid-tight seal almost regardless of the care or lack of care used in forming the parts and/or in assembling the joint.

It will be obvious that factors entering into the construction and operation of the described devices will in most cases have to be empirically determined in view of the necessities of particular cases. For example, where my invention is embodied in a pipe joint assembly or the like the pipe diameter, structural strength and pipe material, must be considered in making specifications for the ring. In general, rings made of such brittle material, as, for example, ordinary cast iron; or such soft material as ordinary lead, are not suitable. Other factors are (1) diameter of ring; (2) wall thickness; (3) length unconstrained and possible relation of length under constraint to unconstrained length; (4) angle of surface on ring or constraining face through which diameter-changing force is made effective; (5) time taken in accomplishing diameter-changing operation; and (6) friction between ring and cooperating elements.

My experience leads me to believe that the following statements are correct:

In the case of a ring of small diameter the length of the ring and the thickness of its circumferential wall should be about the same. As the diameter of the ring increases the length of the ring in relation to the thickness of its circumferential wall may also increase. Also the thicker the circumferential wall is the longer the ring may be. For very small rings the length of the ring and the thickness of its circumferential wall should be about the same. The length of the ring may be increased for the same wall thickness if its diameter is increased, and also the length of the ring may be increased as the thickness of its circumferential wall is increased.

The angle of the constraining face (factor 4) contains in some degree the time element but it also contains another element. The force applied to the tube from the sloping face can be resolved (in the well known and customary fashion) into two component forces one acting axially of the ring and the other acting at right angles to the axis of the ring. If the force acting axially of the ring is the major component then the major effect will be to cause the ring to buckle (this effect being assisted by the right angle component) rather than expand as a whole. If the two components are equal then there will still be a most emphatic buckling effect as well as expanding effect, and as the resistance of the end of the ring in contact with the sloped face to movement at right angles to the axis depends upon the ease with which that end can thus move, it is obvious that the greater the axial component is, the greater will be the tendency of the ring to buckle instead of to expand as a whole. Therefore cross axial component should be greater than actual component and the angle should be less than 45°. If this reasoning be correct then it would follow that within limits the more gentle the slope (that is to say the less the axial component in relation to the cross axial component) the greater the unconstrained length (factor 3) of a ring might be. As a matter of fact this is what seems to happen.

For example. If two duplicate rings may be taken, each of the same circumferential wall section, the same diameter and the same material, and one of them be placed in an apparatus as illustrated with a face which slopes at an angle of 16 degrees to the axis of the ring and the tapered surface be moved axially of the ring to expand it and the ring be of such a length that, with a 16 degree angle, the end in contact with the sloping surface expands more than the unconstrained end, thus producing a cone shaped ring; the duplicate ring if put into a duplicate apparatus with a slope of two degrees will expand not only as a unit but will expand without practical change in form, emerging as a cylindrical ring with its circumferential wall practically parallel to the axis just as it was before expansion.

The following conclusions emerge.

Assuming that we take apparatus with the angle of the contracting surface the same in every case, and the time taken in performing the diameter-changing operation roughly similar, as would be the case in tightening up screws or the like or using a power press:

For a ring of given diameter, the thicker the wall the greater the length may be.

For a ring of given thickness, the greater the diameter the greater the length may be.

For a ring of given length, the greater the diameter the less the thickness need be.

Also, broadly speaking, for a ring of given diameter the less the angle (slope of contracting surface) the less the thickness need be or the greater length may be.

If it is desired to expand a ring with minimum possible change not only in shape but also in actual dimensions of circumferential wall section, then the proportions of the ring, and the slope, and the area of the pressure-receiving surface and the conditions affecting the coefficient of friction between that surface and the ring, and the time taken to perform the operation of changing diameter, must all be taken into consideration much more carefully than if it be desired merely to change the diameter of the ring as a whole without regard to whether the amount of change of diameter of the unconstrained portion is exactly the same as the amount of change of diameter of the constrained portion.

From what has been said regarding the components of the diameter-changing force it will be obvious that the coefficient of friction between the expanding surface and the ring is also an important factor. Under every condition it is desirable to keep this coefficient as low as possible, to which end it is desirable that the surfaces in contact be lubricated and that the surfaces themselves be smooth, in fact as smooth as possible.

In order merely to produce such changes of diameter as are normally desirable with such rings as are suitable for a vast multitude of uses, no necessity exists for particular smoothness of the contacting surfaces. So long as the surfaces in contact are reasonably smooth and free from irregularities of a friction producing nature a wide variety of angle of the expanding surface may be used with success to produce the desired change of diameter throughout the length of the ring.

The area of contact of the particles of the ring directly subjected to pressure, with the particles of the ring subjected to that pressure only through the internal adhesion of the particles of the ring, seems to have a definite effect upon the result. It seems only reasonable that it should be so, because nothing except this reluctance of the particles to slip past each other can produce expansion of the portion of the ring not directly subjected to pressure.

As indicated, I have obtained excellent results with a ring of cross-section as shown in which all the corner angles are 90° or more; and force is applied to the ring interiorly thereof at a point or points at the end or intermediate the midlength of the ring and the end thereof. And in general it is true that the thickness of ring which will change in diameter substantially without change in the cross-sectional shape of application of force, upon the extent of the length of the ring which is unsupported by the force-applying surface: the greater the length of the unsupported surface, the thicker the ring must be.

I claim:

1. The combination of two elements to be joined, one of which is a solid ring of metal resistant to change of form and possessing ductility and of substantial thickness throughout its length, each element having a substantially circular continuous cooperative contact portion, at least one of which contact portions is a sloping surface along which the other contact portion rides upon contact of the portions and during the drawing together of the elements, means for applying force axially of the elements to draw and hold them together, the distribution of the mass of the ring relative to the length thereof, the internal structure of the ring and the angularity of the sloping surface being such that the force applied is resolved into axial and cross-axial components, to which components the resistance to bending of each and every elemental cross axial section of the ring is greater than the resistance to change of diameter of the ring substantially as a unit, whereby the ring changes in diameter substantially as a unit, making and maintaining a sealed joint between the contact portions.

2. The combination of two elements to be joined, one of which is a solid ring of metal resistant to change of form and possessing ductility and of substantial thickness throughout its length, each element having a substantially circular continuous cooperative contact portion, at least one of which contact portions is a sloping surface along which the other contact portion rides upon contact of the portions and during the drawing together of the elements, means for applying force axially of the elements to draw and hold them together, the distribution of the mass of the ring relative to the length thereof, the internal structure of the ring and the angularity of the sloping surface being such that the force applied is resolved into axial and cross-axial components, to which components the resistance to bending of each and every elemental cross-axial section of the ring is greater than the resistance to increase of diameter of the ring substantially as a unit, whereby the ring increases in diameter substantially as a unit, making and maintaining a sealed joint between the contact portions.

3. The combination of two elements to be joined, one of which is a solid ring of metal resistant to change of form and possessing ductility and of substantial thickness throughout its length, the said elements having corresponding substantially circular continuous cooperative contact portions, said contact portions being sloping surfaces along one of which the other rides upon contact of the portions and during the drawing together of the elements, means for applying force axially of the elements to draw and hold them together, the distribution of the mass of the ring relative to the length thereof, the internal structure of the ring and the angularity of the sloping surfaces being such that the force applied is resolved into axial and cross-axial components, to which components the resistance to bending of each and every element cross-axial section of the ring is greater than the resistance to change of diameter of the ring substantially as a unit, whereby the ring changes in diameter substantially as a unit, making and maintaining a sealed joint between the sloping contact surfaces.

4. The combination of two elements to be joined, one of which is a solid ring of metal resistant to change of form and possessing ductility and of substantial thickness throughout its length, the said elements having corresponding substantially circular continuous cooperative contact portions, said contact portions being sloping surfaces along one of which the other rides upon contact of the portions and during the drawing together of the elements, means for applying force axially of the elements to draw and hold them together, the distribution of the mass of the ring relative to the length thereof, the internal structure of the ring and the angularity of the sloping surfaces being such that the force applied is resolved into axial and cross-axial components, to which components the resistance to bending of each and every elemental cross-axial section of the ring is greater than the resistance to increase of diameter of the ring substantially as a unit, whereby the ring increases in diameter substantially as a unit, making and maintaining a sealed joint between the sloping contact surfaces.

5. The combination with two elements to be joined having tubular ends, of a solid ring of metal resistant to change of form and possessing ductility and of substantial thickness throughout its length, said ring being interposed between the ends of the elements, each element having a substantial circular continuous contact portion, said ring having a pair of substantially circular continuous contact portions for cooperative contact one each with the contact portions of each element, at least one portion of each pair of contacting portions being a sloping surface along which the other portion of the pair rides during the drawing of the elements towards each other, means for applying the force axially of the elements to draw them and to hold them drawn toward each other, the distribution of the mass of the ring relative to the length thereof, the internal structure of the ring and the angularity of said sloping surfaces being such that the force applied is resolved into axial and cross-axial components, to which components the resistance of bending of each and every elemental cross-axial section of the ring is greater than the resistance to change of diameter of the ring substantially as a unit, whereby the ring changes in diameter substantially as a unit, making and maintaining sealed joints between the contact portions of the ring and the contact portions of each element 6. The combination with two elements to be joined having tubular ends, of a solid ring of metal resistant to change of form and possessing ductility and of substantial thickness throughout its length, said ring being interposed between the ends of the elements, each element having a substantially circular continuous contact portion, said ring having a pair of substantially circular continuous contact portions for cooperative contact one each with the contact portions of said elements, at least one portion of each pair of contacting portions being a sloping surface along which the other portion of the pair rides during the drawing of the elements toward each other, means for applying the force axially of the elements to draw them and to hold them drawn toward each other, the distribution of the mass of the ring relative of the length thereof, the internal structure of the ring and the angularity of said sloping surfaces being such that the force applied is resolved into axial and cross-axial components, to which components the resistance to bending of each and every elemental cross-axial section of the ring is greater than the resistance to increase of diameter of the ring substantially as a unit, whereby the ring increases in diameter substantially as a unit, making and maintaining sealed joints between the contact portions of the ring and the contact portions of said elements.

7. The combination set forth in claim 6 in which the ring is of general rectangular cross-section with the inner corners thereof cut away to produce sloping surfaces.

In testimony whereof I affix my signature.

WYLIE G. WILSON.